(No Model.) 3 Sheets—Sheet 1.

A. A. DE LOACH
SAW MILL.

No. 434,770. Patented Aug. 19, 1890.

WITNESSES: INVENTOR
Luke P. Hayden. Alonzo A. DeLoach
BY
Albert H. Wood
ATTORNEY.

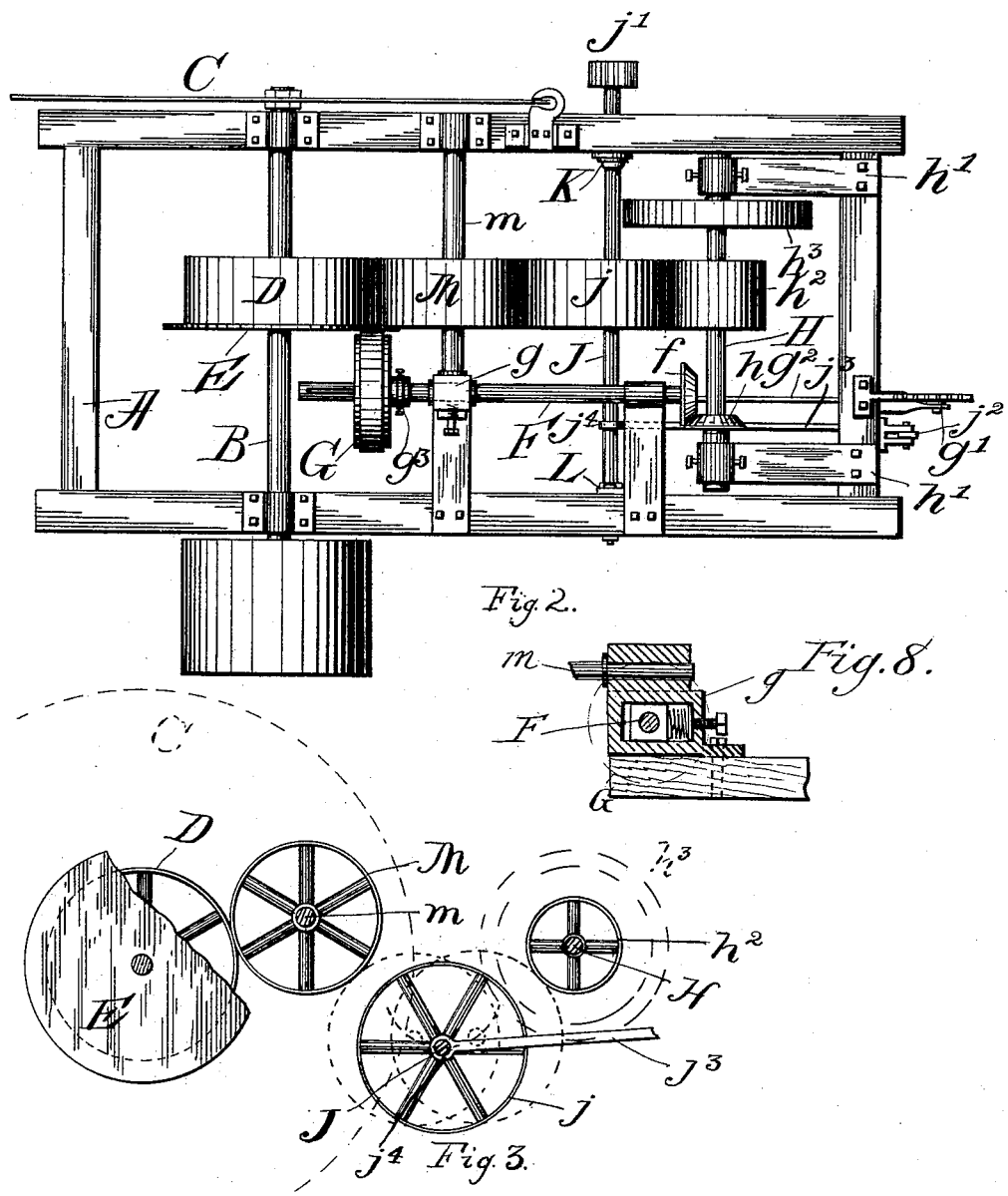

(No Model.) 3 Sheets—Sheet 3.

A. A. DE LOACH.
SAW MILL.

No. 434,770. Patented Aug. 19, 1890.

WITNESSES:

INVENTOR
Alonzo A. DeLoach
BY
Albert H. Noork
ATTORNEY.

UNITED STATES PATENT OFFICE.

ALONZO A. DE LOACH, OF ATLANTA, GEORGIA.

SAW-MILL.

SPECIFICATION forming part of Letters Patent No. 434,770, dated August 19, 1890.

Application filed April 2, 1890. Serial No. 346,317. (No model.)

*To all whom it may concern:*

Be it known that I, ALONZO A. DE LOACH, a citizen of the United States, and a resident of Atlanta, in the county of Fulton, State of Georgia, have invented certain new and useful Improvements in Saw-Mills; and I do declare the following to be a full, clear, and exact description of the invention, such as will enable others skilled in the art to which it appertains to make and use the same, reference being had to the accompanying drawings, and to letters of reference marked thereon, which form a part of this specification.

This invention relates to saw-mills having more particular reference to that class of such machines as have a variable feed, so as to do away with several objections to said variable-feed mills as heretofore constructed, and to add to the facility with which they can be operated, the details of the devices whereby the end is attained being hereinafter fully set forth.

Figure 1:
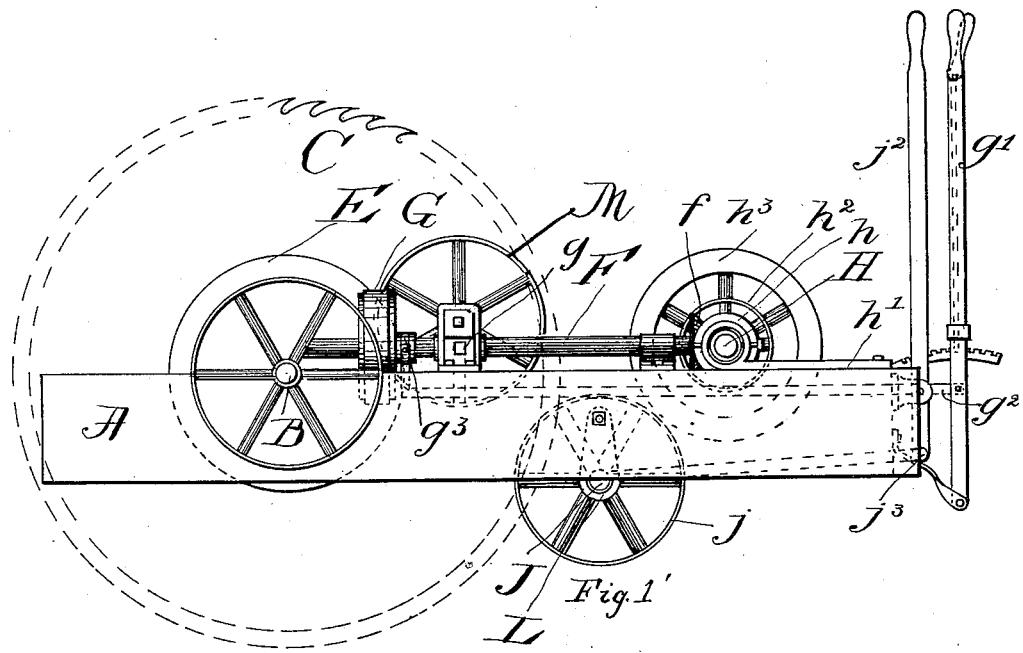
Figures 4, 5:
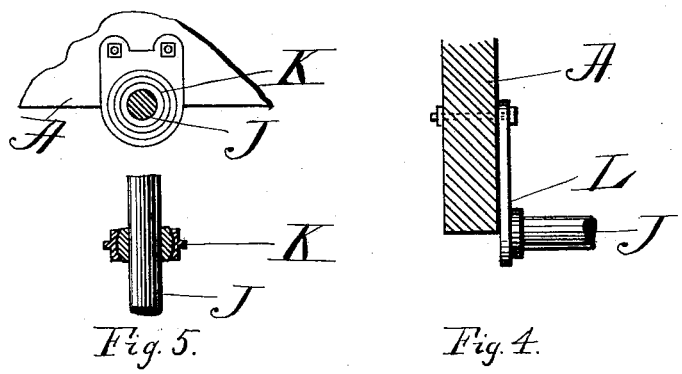
Figure 6:
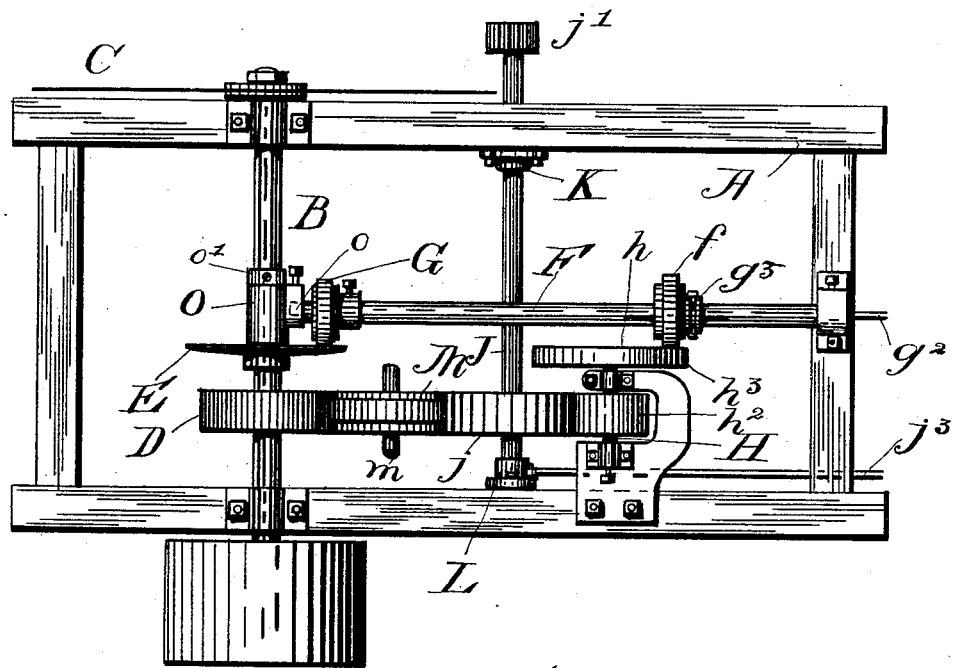
Figure 7:
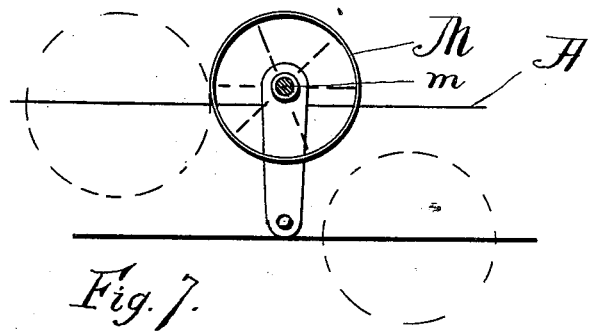

In the accompanying drawings, Figure 1 is a side elevation of the device, showing the operative parts. Fig. 2 is a plan thereof further illustrating said parts. Fig. 3 is a detail view showing the operation more clearly. Fig. 4 is an edge view of the swinging arm carrying the bearing for the pinion-shaft. Fig. 5 is two views showing the ball-and-socket journal-bearing for the outer end of said shaft. Fig. 6 is plan of a modification whereby the operative parts are removed as far as practicable from the saw, and all toothed gearing dispensed with. Fig. 7 illustrates, in a somewhat diagrammatical manner, the swinging journaling, where desired, of the idler friction-wheel. Fig. 8 is a cross-section of the journal-box carrying the spring-bearing which keeps the friction-wheel in contact with the friction-disk.

In the figures, like reference-marks indicating corresponding parts in the several views, A is the frame; B, the saw-mandrel, and C is the saw. The mandrel B carries, besides the usual hand-wheel and, if used, a pulley for driving a top saw, the friction-wheel D, made integrally, if desired, with the disk E, also carried by said saw-mandrel. The shaft F, suitably journaled in the frame, has sliding freely thereon and revolving with said shaft by means of a feather-and-groove construction the friction-wheel G, which is faced with a suitable material or constructed in such a way that paper or leather, or, in cheaper mills, wood, may form the contact-surface of the said wheel G against the face of the disk, against which said wheel is pressed by the spring-bearing $g$, Fig. 2. The wheel G moves longitudinally on its shaft in response to a movement of the lever G' by reason of its connecting-rod $g^2$ having a bifurcated end engaging with a ring $g^3$, which said ring freely turns on the hub of said wheel G. On the other end of the shaft is a gear $f$, which engages with a corresponding bevel-gear $h$ on the shaft H, it being understood, however, that friction-gearing of any character is equivalent, as only motion is desired without absolutely requiring positiveness of said motion. In a slow-running mill bevel-gears would be sufficient; but friction-gearing might be necessary in a fast-running mill. In case bevel friction-disks were employed a spring journal-box would be desirable to hold same in proper frictional contact.

The shaft H is in the construction shown journaled in journal-boxes carried by the arms $h'$, secured to a cross-bar of the frame; but no special efficacy is claimed for such construction. Said shaft carries the friction-wheel $h^2$ and the balance-wheel $h^3$, said friction-wheel by contacting with the wheel $j$, which is carried on the shaft J, driving the log-carriage to the saw, as will be hereinafter fully described, and the balance-wheel by its momentum taking the immense strain of reversing the log-carriage from the surface of the wheel G, where it contacts with the disk E, which is obviously a great advantage, inasmuch as it is this reversing that destroys the friction-increasing material with which the said wheel G is tired, and which is so great that a wooden wheel in place of the wheel G, however tough and hard the wood may be and clamped between metal face-plates, is insufficient for the place, and will only stand for a very limited time the wear and tear necessary to the stoppage and reversing of the carriage by its contacting with the disk E. The shaft has near its middle the hereinbefore-mentioned friction-wheel $j$, while on its outer end is a pinion $j'$, which engages with a spur-gear driving the carriage either by means of a rack and pinion or with rope and winding-drum construction. The shaft J is journaled at the end carrying the pinion in a swiveled journal-box, which is shown in somewhat rudimentary form in Fig. 5, Fig. 4 showing the swinging or oscillating journal-box in which the other end is journaled, said boxes being respectively lettered K and L. Encircling the said shaft J is a collar $j^4$, which is connected with the short arm of the lever $j^2$ by means of the connecting-rod $j^3$. From the foregoing description it will be seen that by a movement of the lever $j^2$ in one direction the said wheel J will contact with the wheel $h^2$, which, as stated hereinbefore, is driven through the contact of the wheel G of the disk E, this motion on the shaft I being had without a sufficient inclination of its axis to interfere with the meshing of the pinion $i$ with its spur-wheel. A movement of the said lever $j^2$ in the opposite direction will cause the wheel $j$ to contact with the wheel M on the shaft $m$, which said shaft is suitably journaled, and contact is had, preferably, at all times between the wheel M and the wheel D on the saw-mandrel, by which contact the said wheel M is caused to revolve with the wheel D, and consequently with the saw-mandrel, and the said wheel M will cause the shaft J to revolve by contacting with the wheel $j$ in an opposite direction from which it will be driven by the wheel $h^2$ when said wheel $j$ is brought into contact therewith, which will necessarily reverse the direction in which the carriage moves and drives the carriage from the saw, and when geared in substantially the proportions shown will return it much faster to a position to be run to the saw than the feeding device will run it in the opposite direction. If desired, both ends of the shaft J may be hung in swinging journals, and in that case the gear into which the pinion $j'$ meshes would have its center coincide with the pivotal center of the hangers.

The operation of this device is as follows: The material to be sawed having been placed on the log-carriage and the wheel G having been set at a proper distance from the center of the disk E to give to the saw the proper amount of cut per revolution, according to the kind or condition of the timber to be sawed, it will remain in that position. The lever, however, regulating the same being close at hand, may be employed to reduce the feed instantly in case of emergency. The wheel $j$ is then by means of the lever $j^2$ and its connection with the shaft J or its journal-bearing brought into contact with the wheel $h^2$ and the carriage started and driven forward, the momentum of the balance-wheel $h^3$ on the shaft H overcoming any sudden jar, which would otherwise tend to disintegrate the surface of the wheel G. As soon as the cut is made the wheel $j$ is withdrawn from contact with the wheel $h^2$, and by a further oscillation on its swinging bearing thrown into frictional contact with the wheel M, which will reverse the carriage and drive it back at an increased speed to its starting-point, and the operation repeated.

In Fig. 6 is illustrated, as mentioned above, the preferable means whereby the operative parts could be condensed and removed from the saw, and thereby removing danger of any accumulation of sawdust thereon. In the specific construction shown in said Fig. 6 friction-gears are substituted for the bevel-gears $f$ and $h$ shown in Fig. 1, the equivalent of the gear $h$ on the shaft H consisting of a friction-disk on the side of the balance-wheel $h^3$, and both ends of the shaft F are carried in spring journal-boxes, in order to insure a good frictional contact of the wheels G and $h$, friction-gear—the equivalent to the toothed gear $f$—being capable of free longitudinal movement on the shaft F. The shaft H is carried in one bracket instead of being journaled on two, as it is shown in Fig. 1. The end of the shaft F nearest the saw-mandrel is journaled in a bearing $o$, projecting from the side of the collar O, in which the shaft runs, which collar O is held in position by a set-collar $o'$ on the mandrel. The wheel G is secured to the shaft F by a set-screw, and may be moved longitudinally thereon, thereby adjusting the speed of said shaft, and by setting this wheel when the wheel $f$ is set to run the shaft H at an average rate of speed a point will be permanently fixed from which there may be equal variation slower or faster by means of the movement of said wheel on the shaft F.

Having thus described my invention, what I claim as new, and desire to secure by Letters Patent of the United States, is—

In a device of the class described, the combination of the frame A, the mandrel B, the disk E, and the wheel D, mounted on said mandrel, the friction-wheel M, engaging with the wheel D, the shaft F, journaled longitudinally of the frame, the adjustable friction-wheel carried on said shaft F and engaging with the friction-disk E, the friction-wheel $h^2$, mounted on the shaft H, geared with the shaft F, the shaft J, the hangers carrying said shaft, the friction-gear carried on said shaft, and the means for moving said shaft J, substantially as shown and described.

In testimony whereof I hereunto affix my signature in presence of two witnesses.

ALONZO A. DE LOACH.

Witnesses:
N. P. WOOD,
A. P. WOOD.